(12) United States Patent
Girondi (10) Patent No.: US 11,994,048 B2
(45) Date of Patent: May 28, 2024

(54) BLOW-BY GAS FILTRATION ASSEMBLY WITH SUPPORT AND CONTROL SHAFT

(71) Applicant: UFI FILTERS S.P.A., Mantova (IT)

(72) Inventor: Giorgio Girondi, Mantova (IT)

(73) Assignee: UFI FILTERS S.P.A., Mantova (IT)

( * ) Notice: Subject to any disclaimer, the term of this patent is extended or adjusted under 35 U.S.C. 154(b) by 396 days.

(21) Appl. No.: 17/613,388

(22) PCT Filed: May 28, 2020

(86) PCT No.: PCT/IB2020/055059
§ 371 (c)(1),
(2) Date: Nov. 22, 2021

(87) PCT Pub. No.: WO2020/240456
PCT Pub. Date: Dec. 3, 2020

(65) Prior Publication Data
US 2022/0220872 A1    Jul. 14, 2022

(30) Foreign Application Priority Data
May 29, 2019    (IT) .......................... 102019000007500

(51) Int. Cl.
*F01M 13/04* (2006.01)
*B01D 46/00* (2022.01)
(Continued)

(52) U.S. Cl.
CPC ......... *F01M 13/04* (2013.01); *B01D 46/0056* (2013.01); *B01D 46/2403* (2013.01);
(Continued)

(58) Field of Classification Search
CPC ... F01M 2013/0422; F01M 2013/0438; F01M 11/08; F01M 13/00; B04B 5/005; B01D 46/0056; B01D 45/12
(Continued)

(56) References Cited

U.S. PATENT DOCUMENTS

2016/0138445 A1   5/2016  Reichelt et al.
2018/0104633 A1*  4/2018  Bonne .................... F01M 13/04
(Continued)

FOREIGN PATENT DOCUMENTS

FR     2 933 626 A1      1/2010
WO     2017/145072 A1    8/2017

OTHER PUBLICATIONS

International Search Report and Written Opinion of the International Searching Authority for International Patent Application No. PCT/IB2020/055059 dated Aug. 26, 2020, 11 pages.
(Continued)

*Primary Examiner* — Long T Tran
*Assistant Examiner* — James J Kim
(74) *Attorney, Agent, or Firm* — Merchant & Gould P.C.

(57) ABSTRACT

A blow-by gas filtration assembly has an axis and includes a main body having a filtration chamber fitted with an outlet mouth at the axis. A filter group extends along the axis having a hollow cylindrical shape with a central chamber. An engine group operatively connects to the filter group for controlling its rotation about the axis. The engine assembly includes a rotor and a stator. A support and control shaft formed as a hollow body extends along the axis and includes an engine portion on which the rotor integrally mounts and a filter portion on which the filter group integrally mounts so that controlled rotation of the rotor corresponds to rotation of the shaft and thus of the filter group. The filter portion includes an outlet duct of the filtered blow-by gases inside which the outflow of the filtered blow-by gases towards the outlet mouth takes place.

18 Claims, 8 Drawing Sheets

(51) Int. Cl.
*B01D 46/24* (2006.01)
*B01D 46/64* (2022.01)

(52) U.S. Cl.
CPC .......... *B01D 46/64* (2022.01); *B01D 2267/40* (2013.01); *B01D 2271/027* (2013.01); *B01D 2279/35* (2013.01); *F01M 2013/0438* (2013.01)

(58) Field of Classification Search
USPC .......................................................... 55/403
See application file for complete search history.

(56) References Cited

U.S. PATENT DOCUMENTS

| | | | |
|---|---|---|---|
| 2018/0236387 A1 | 8/2018 | Parikh et al. | |
| 2019/0136728 A1* | 5/2019 | Barreteau | B01D 45/14 |
| 2019/0210039 A1* | 7/2019 | Kuhn | B04B 7/16 |
| 2020/0248597 A1* | 8/2020 | Grein | B01D 17/045 |

OTHER PUBLICATIONS

Italian Search Report for Italian Patent Application No. 102019000007500 dated Feb. 26, 2020, 2 pages.

* cited by examiner

FIG.5f ature, a claim of priority is made to each of
BLOW-BY GAS FILTRATION ASSEMBLY WITH SUPPORT AND CONTROL SHAFT This application is a National Stage Application of PCT/IB2020/055059, filed 28 May 2020, which claims benefit of Ser. No. 10/2019000007500, filed 29 May 2019 in Italy, and which applications are incorporated herein by reference. To the extent appropriate, a claim of priority is made to each of the above-disclosed applications.

FIELD OF APPLICATION

The present invention relates to a blow-by gas filtration assembly.

In particular, the blow-by gas filtration assembly of the present invention is fluidly connectable to the crankcase ventilation circuit of an internal combustion engine system inside of a vehicle to receive blow-by gases (from said crankcase) and filter from them the suspended particles contained therein.

Specifically, "blow-by gas" means oil vapours vented from the crankcase of an internal combustion engine during its operation. In particular, said blow-by gases have a composition similar to that of exhaust gases and are generated by combustion of the air/fuel mixture in the combustion chamber. Instead of reaching the exhaust gas emission circuit, these gases leak into the lower portion of the crankcase, passing alongside the cylinders and bringing carbon particles and oil drops with them. In the present discussion, for the sake of simplicity, blow-by gases are considered to consist of air and suspended particles; said suspended particles comprise oil droplets and/or carbonaceous particulates.

STATE OF THE ART

In the state of the art, solutions of filtration assemblies that is fluidly connectable to the crankcase and suitable for venting it from blow-by gases are known of.

Specifically, blow-by gas filtration assembly solutions which separate unwanted suspended particles from the aforesaid blow-by gases are known of, comprising a filter group having such purpose.

In the state of the art, a plurality of embodiments of filtration assemblies are known: for example, a first type provides for the presence of a filter group comprising a porous filter medium suitable for filtering blow-by gases when crossed by them; a second type provides for the presence of a filter group comprising a plurality of discs mutually spaced apart and guided in rotation, in which by the action of the centrifugal force the suspended particles are separated from the air; a third type which provides for the combination of the first two types, in which, in fact, a porous filter medium is provided that is guided in rotation.

In this context, with particular reference to the aforementioned third preferred embodiment, the known solutions are particularly complex and difficult to assemble (and disassemble).

SOLUTION ACCORDING TO THE INVENTION

In the aforesaid state of the art the need is therefore strongly felt to have a blow-by gas filtration assembly that solves the aforesaid problem, being simple in shape and above all requiring simple assembly (and disassembly).

The purpose of the present invention is to provide a new improved embodiment of a blow-by gas filtration assembly satisfying said requirement.

DESCRIPTION OF THE DRAWINGS

Further characteristics and advantages of the invention will, in any case, be evident from the description given below of its preferred embodiments, made by way of a non-limiting example with reference to the appended drawings, wherein:

FIGS. 4a and 4b are two cross-section views respectively along the cross-section planes V-V and VI-VI shown in FIG. 3;

FIG. 4' is an enlargement of the area A shown in FIG. 4a;

DETAILED DESCRIPTION

With reference to the appended drawings, reference numeral 1 denotes a blow-by gas filtration assembly suitable for performing a filtration/separation action on particles (liquid and/or solid) suspended in the gas stream.

Said blow-by gas filtration assembly 1 is fluidly connectable to a crankcase ventilation circuit of an internal combustion engine of a vehicle to receive blow-by gases and filter from them the suspended particles contained therein returning a stream of clean gas (i.e. filtered) to other vehicle systems such as, for example, to the engine air intake circuit communicating with the combustion chamber of the internal combustion engine.

Preferably, said blow-by gas filtration assembly 1 can be directly assembled to the crankcase of an internal combustion engine of a vehicle. In particular, the present invention is not limited to this feature; the blow-by gas filtration assembly 1 could be configured as a stand-alone device comprising respective inlet and outlet ports communicating respectively with the crankcase, for receiving blow-by gases to be filtered, and with the air intake circuit, for recirculating the gas stream filtered of solid and liquid particles towards the combustion chamber.

According to the present invention, the filtration assembly 1 comprises an X-X axis with respect to which the components described below extend or are positioned.

According to the present invention, the blow-by gas filtration assembly 1 comprises a main body 2. Preferably, the other components of the system are positioned in or on said main body 2, as described extensively below and evident from the exemplary figures attached below.

In particular, the main body 2 comprises a filtration chamber 20 in which filtration/separation operations of the blow-by gases take place. The filtration chamber 20 is therefore fluidly connected to the crankcase ventilation circuit of an internal combustion engine of a vehicle to receive dirty blow-by gases, i.e. comprising suspended particles (solid and/or liquid), and emit clean blow-by gases, i.e. cleaned of suspended particles, into the engine air intake system.

According to a preferred embodiment, the main body 2 comprises respective blow-by gas inlets and outlets.

In particular, the main body 2 comprises an inlet mouth 21 (not shown) fluidly connected with the crankcase ventilation circuit of a vehicle to receive blow-by gases to be filtered. Preferably, said inlet mouth 21 is made substantially parallel to the X-X axis spaced therefrom. Preferably, said inlet mouth 21 is made on the side wall of the main body 2. Preferably, said inlet mouth 21 is made on the wall of the main body 2 defining the filtration chamber 20.

The main body 2 comprises an outlet mouth 22. Said outlet mouth 22 is made positioned on the X-X axis. preferably, the outlet mouth 22 is perpendicular to said X-X axis. Preferably, the outlet mouth 22 is coaxial to the X-X axis.

The outlet mouth 22 is bounded laterally, annularly, by an outlet edge 220.

According to a preferred embodiment, from the outlet mouth 22, the main body 2 provides for an outlet connection that interfaces with the engine air intake circuit communicating with the combustion chamber of the internal combustion engine of a vehicle. According to a preferred embodiment, said outlet connection communicates with an outlet opening made on the coupling flange of the main body 2 to the internal combustion engine crankcase.

According to a preferred embodiment, moreover, the main body 2 comprises an insertion opening 25 through which the components described below can be inserted inside the main body 2, preferably inside the filtration chamber 20. Said insertion opening 25 is made in a position opposite the outlet mouth 22. Preferably, the insertion opening 25 is made along the X-X axis having its extension (orientation) parallel to the outlet mouth 22. Preferably, the insertion opening 25 is defined laterally, annularly, by an insertion edge 250. Preferably, the insertion edge 250 and the outlet edge 220 are respectively concentric with respect to the X-X axis. Preferably, the insertion opening 25 defines a larger opening of the outlet mouth 22 so as to allow and facilitate the insertion operations of the various components.

According to the present invention, the blow-by gas filtration assembly 1 comprises a filter group 3, housing and operating in said filtration chamber 20, specifically suitable for performing said filtration/separation operations of the particles suspended in blow-by gases.

The filter group 3 extends along the X-X axis having a hollow cylindrical shape, comprising, in fact, a central chamber 300.

The filter group 3 can be crossed radially by blow-by gases. Preferably, the filter group 3 can be crossed by blow-by gases in a radial direction from the outside towards the inside.

Preferably, the inlet mouth 21 is radially facing the filter group 3. According to a preferred embodiment, the inlet mouth 21 is radially facing the outer surface of the filter group 3.

Preferably, the outlet mouth 22 is axially facing the central chamber 300.

In other words, the filter group 3 identifies, in the filtration chamber 20, a dirty side in which there are blow-by gases to filter and a clean side in which there are filtered blow-by gases. Preferably, the outlet mouth 22 is fluidly connected with said clean side.

According to a preferred embodiment, the central chamber 300 of the filter group surrounds the clean side in which the filtered blow-by gases are present and fluidly communicates with the outlet mouth 22.

According to a preferred embodiment, the filter group 3 comprises a filter medium 30. The filter medium 30, which can be crossed radially comprises a non-woven fabric pleated in the form of a star or a porous cylindrical septum.

Moreover, according to a preferred embodiment, the filter group 3 comprises two filter plates 31, 32 arranged at the ends of the filter medium 30.

In addition, according to a preferred embodiment, the filter group 3 comprises a central structure 33 which is housed inside the filter medium 30 and joins the two filter plates 31, 32, so that the filter plates 31, 32 are integrally connected in rotation. Preferably, said central structure 33 has a plurality of through openings suitable to allow the passage of the fluid being filtered.

As shown in the attached figures, the central chamber 300 extends through the filter plates 31, 32 surrounded by the filter medium 30.

According to a preferred embodiment, the central chamber 300 extends through respective through openings 310, 320 made on the filter plates 31, 32. Preferably, said openings 310, 320 are concentric to the X-X axis, like the central chamber 300.

According to the present invention, moreover, the filtration assembly 1 comprises an engine group 4 operatively connected to the filter group 3 to command it in rotation about the X-X axis.

According to the present invention said engine group 4 comprises a rotor 41 and a stator 42. The electrical actuation of the stator 42 results in rotation of the rotor 41. Preferably, the rotor 41 is housed in a rotor chamber 420 surrounded by the presence of the stator 42. Preferably, the rotor 41 is at least partially housed in the rotor chamber 420 surrounded by the presence of the stator 42.

According to a preferred embodiment, the engine group 4 is of the electric type, preferably brushless.

According to a preferred embodiment, the rotor 41 is a toroid in ferromagnetic material. Preferably, the rotor 41 is a permanent magnet.

According to a preferred embodiment, the rotor 41 comprises one or more elements in ferromagnetic material arranged in the shape of a toroid.

According to a preferred embodiment, the stator 42 comprises a plurality of energizable magnetic poles for generating a rotating magnetic field. Preferably, said rotating magnetic field is suitable to interact with the rotor to determine its rotation around its axis and thus determine the rotation of the shaft 5 and therefore of the filter group 3.

Preferably, further, the engine group 4 comprises an engine body 40 housing the stator 42 in which a rotor chamber 420 is defined in which the rotor 41 is housed. Preferably, the engine body 40 can be sealingly fitted to the main body 2.

Preferably, the engine body 40 sealingly engages the main body 2 to close the insertion opening 25. The engine body 40 can in fact be mounted axially to the main body 2.

According to a preferred embodiment, the engine group 4 comprises an electronic board electrically connected to the vehicle controller by means of an electrical connector integrated on the engine body 40.

Preferably, said electronic board is electrically connected to a series of windings provided on the stator, suitable for energizing the magnetic poles of the stator to establish a rotating magnetic field flow, determining the rotation of the rotor 41 and thus of the shaft 5 and of the filter group 3.

According to the present invention, the blow-by gas filtration assembly 1 comprises a support and control shaft 5.

Such shaft 5 is a hollow body extending along the X-X axis and is specially designed to be operatively connected to the filter group 3 and the engine group 4. The shaft 5 extends in length both inside the filtration chamber 2 and inside the engine group 4, inside the rotor chamber 420.

Preferably, the shaft 5 is a hollow body made as a single component.

According to an alternative embodiment, the shaft is a hollow body composed of two or more parts mechanically connectable with each other (e.g. by welding, mechanical couplings, screws or the like) reversibly or irreversibly so as to form a single component, the constituent parts of which rotate synchronously, both with the filter group 3 and with the rotor 41.

The shaft 5 in fact comprises an engine portion 51 on which the rotor 41 is housed and a filter portion 52 on which the filter group 3 is housed. In particular, the rotor 41 and the filter group 3 are mounted integrally to the shaft 5 respectively to the engine portion 51 and to the filter portion 52 in such a way that a controlled rotation of the rotor 41 corresponds to a rotation of the shaft 5 and thus of the filter group 3. In particular, in the present description, "integrally" means that the rotor 41 and the filter group 3 are mechanically connected to the shaft 5 to rotate in unison (or synchronously). Preferably, the rotor 41 and/or the filter group 3 are reversibly (i.e. detachable from) and/or irreversibly (i.e. constituting a single component) engaged to the shaft.

According to a preferred embodiment, the filter group 3 and the filter portion 52 are mutually engaged by a shape coupling respectively comprising along the X-X axis at least a first notch 308 and a first protrusion 528 housed in said first notch 308. Preferably, the first notch 308 is located on the filter group 3 in the central chamber 300 and the first protrusion 528 is made on the shaft 5 protruding from it radially, or vice versa. According to a preferred embodiment, there are a plurality of first notches 308 and subsequent first protrusions 528 (mutually angularly equispaced).

According to a preferred embodiment, one or more (preferably two) retaining protrusion elements 309 are made at the sides of the first notch 308. Preferably, the retaining protrusion elements 309 protrude radially relative to the first notch 308. According to a preferred embodiment, such retaining protrusion elements 309 comprise one or more protrusions protruding radially in the opposite direction to that of the first notch 308.

According to a preferred embodiment, on the sides of the first protrusion 528 are one or more (preferably two) safety housings 529 in which the retaining protrusion elements 309 are housed. Preferably, the first protrusion 528 protrudes radially relative to the safety housings 529.

Preferably, therefore, the retaining protrusion elements 309 housed in the respective safety housings 529 retain the first protrusion 528 in the respective first notch 308, preventing an undesirable exit therefrom. According to a preferred embodiment, such safety housings 529 comprise one or more recesses made radially in the opposite direction to that of the first protrusion 528.

In other words, according to a preferred embodiment, the retaining protrusion elements 309 and the respective safety housings 529 are intended to act as safety means to prevent the unwanted release of the connection provided between the filter group 3 and the shaft 5 during their rotation.

According to a preferred embodiment, the rotor 41 and the engine portion 51 are mutually engaged with a shape coupling comprising respectively along the X-X axis at least a second notch 418 and a second protrusion 518 housed in said second notch 418. Preferably, the second notch 418 is located on the rotor 41 and the second protrusion 518 is made on the shaft 5 protruding from it radially, or vice versa. According to a preferred embodiment, there are a plurality of second notches 418 and subsequent second protrusions 518 (mutually angularly equispaced). According to the present invention, further, the filter portion 52 (of the shaft 5) comprises inside it an outlet duct 520 of the filtered blow-by gases inside which said the outflow of said filtered blow-by gases towards the outlet mouth 22 takes place. In other words, the shaft 5 is a hollow body the cavity of which forms at least partially the outlet duct 520 of the filtered blow-by gases.

In other words, the outlet duct 520 connects the clean side (of the filter group 3) to the outlet mouth 22. In yet other words, the blow-by gases already subjected to filtration operations flow out into the outlet duct 520.

Preferably, the outlet duct 520 fluidly connects the central chamber 300 of the filter group 3 to the outlet mouth 22.

According to a preferred embodiment, the filter portion 52 is fluidly connected with the central chamber 300 and the outlet mouth 22 to make the filtered blow-by gases flow out.

Preferably, the shaft 5 comprises a duct outlet 522, which fluidly connects the inside of the outlet duct 520 and the outlet mouth 22. The duct outlet 522 is positioned at an axial end of the shaft 5. Preferably, the duct outlet 522 is positioned at the outlet mouth 22. Preferably, the duct outlet 522 is placed on the shaft 5 at the end of the filter portion 52. Preferably, the duct outlet 522 is positioned on the shaft 5 at the axial end of the filter portion 52 distal from the engine portion 51. According to a preferred embodiment, the shaft 5 comprises an internal diffuser 525, housed in the outlet duct 520 in an axially distal position from the duct outlet 522.

Preferably, the internal diffuser 525 is suitable to direct the flow of filtered blow-by gases towards the duct outlet 522.

In particular, the internal diffuser 525 housed in the outlet duct 520 closes the outlet duct 520 at the opposite end of the duct outlet 522 directing the output of filtered gases.

Preferably, the internal diffuser 525 has a substantially tapered shape in the direction of the duct outlet 522.

Preferably, the internal diffuser 525 has a substantially conical, or pyramidal shape, having the apex proximal to the duct outlet 522 and the base distal from the duct outlet 522.

According to a preferred embodiment the filter portion 52 comprises a plurality of longitudinal slots 521 through which filtered blow-by gases flow into the outlet duct 520. Preferably, the longitudinal slots 521 are mutually angularly equidistant.

According to a preferred embodiment, the shaft 5 comprises an abutment ring 53 axially positioned between the engine portion 51 and the filter portion 52.

Preferably, the abutment ring 53 extends in a radial direction and provides an axial abutment and a support to the filter group 3.

According to a preferred embodiment, the filter group 3 is axially inserted above said abutment ring 53. Preferably, the filter group 3 is engaged to the abutment ring 53. Preferably, the filter group 3 sealingly engages the abutment ring 53.

According to a preferred embodiment, the blow-by gas filtration assembly 1 comprises a first support bearing 6 fitted on the shaft 5 to support the shaft 5 to the main body 2 and/or the engine body 40.

Preferably, the first bearing 6 is axially fitted on the engine portion 51.

Preferably, the first bearing 6 is axially fitted on the engine portion 51 of the shaft 5 in an axial position between the rotor 41 and the filter portion 52.

Preferably, the first bearing 6 is axially fitted on the engine portion 51 of the shaft 5 in an axial position between the rotor 41 and the abutment ring 53.

According to a preferred embodiment, the first bearing 6 separates the rotor chamber 420 from the filtration chamber 20.

According to a preferred embodiment, the first bearing 6 closes the filtration chamber 20 tight.

Preferably, the first bearing 6 engages the engine body 40 and seals the rotor chamber 420 tight, dividing it from the filtration chamber 20.

Preferably, the first bearing 6 engages the main body 2 and seals the filtration chamber 20, dividing it from the rotor chamber 420. In other words, the first bearing 6 engages the engine body 40 and seals the rotor chamber 420 so that only air is present inside the rotor chamber 420.

According to a preferred embodiment, the blow-by gas filtration assembly 1 comprises a second bearing 7, for support, which can be fitted on the shaft 5 to support the shaft 5 to the main body 2.

Preferably, by means of the first bearing 6 and the second bearing 7 the shaft 5 is positioned along the X-X axis. Preferably, by means of the first bearing 6 and the second bearing 7 the shaft axis 5 is aligned with the X-X axis.

The present invention is not limited to the shape or type of the first and second bearings; preferably, the term "bearing" means a sliding bearing, a ball bearing, or a bushing.

According to a preferred embodiment, the second bearing 7 is positionable on the filter portion 52 in an axial position distal from the engine 4.

According to a preferred embodiment, the second bearing 7 is positionable on the main body at the outlet mouth 22.

According to a preferred assembly method, the second bearing 7 is installed at the outlet mouth 22 prior to the other components, in particular the filter group 3 and the engine group 4.

Preferably, the second support bearing 7 seals the filtration chamber 20 tight. According to a preferred embodiment, the second support bearing 7 engages the outlet edges 220 defining the outlet mouth 22.

According to a preferred embodiment, the second bearing 7 seals the filtration chamber engaging the outlet edges 220 defining the outlet mouth and the filter portion 52 (preferably in a portion thereof proximal to the shaft end).

Preferably, the first bearing 6 and the second bearing 7 have the same dimensions (having the same diameter of the inner hole designed to come into contact with the outer surface of the shaft 5 and outer diameter designed to come into contact with the respective housing seat).

According to a preferred embodiment, the engine portion 51 of the shaft 5 is also hollow.

According to a preferred embodiment, the shaft 5 is made of thermoplastic material obtained by means of a single moulding operation.

Preferably, the shaft 5 is made of polyphenylene sulphide (PPS).

Preferably, the shaft 5 is made of a polyphenylene sulphide (PPS) based material.

Preferably, the shaft 5 is made of a polyphenylene sulphide (PPS) based material reinforced with fibreglass (PPS+GF15, PPS+GF30, PPS+GF40).

Preferably, the shaft 5 is made of a nylon-based material (PA, PA 6, PA 6.6 or a mixture thereof).

Preferably, the shaft 5 is made of nylon-based material reinforced with fibreglass. (PA+GF, PA 6.6+GF35, PA 6+PA 6.6+GF 35)

Preferably, the shaft 5 is made of a material comprising a polyamide-based compound (e.g. PPA).

According to a preferred embodiment, the shaft 5 is made of a metallic material. Preferably, the shaft 5 is made of aluminium alloy.

According to a preferred embodiment the filter plates 31, 32 sealingly engage the shaft 5 by means of a first annular gasket 315 and a second annular gasket 325.

Preferably, said first annular gasket 315 is a radial gasket. Preferably, said second annular gasket 325 is a radial gasket. Preferably, said first annular gasket 315 engages the abutment ring 53. Preferably, said second annular gasket 325 engages the filter portion 52 of the shaft 5 in a region between the longitudinal openings 521 and the duct outlet opening 522.

Figure 1:
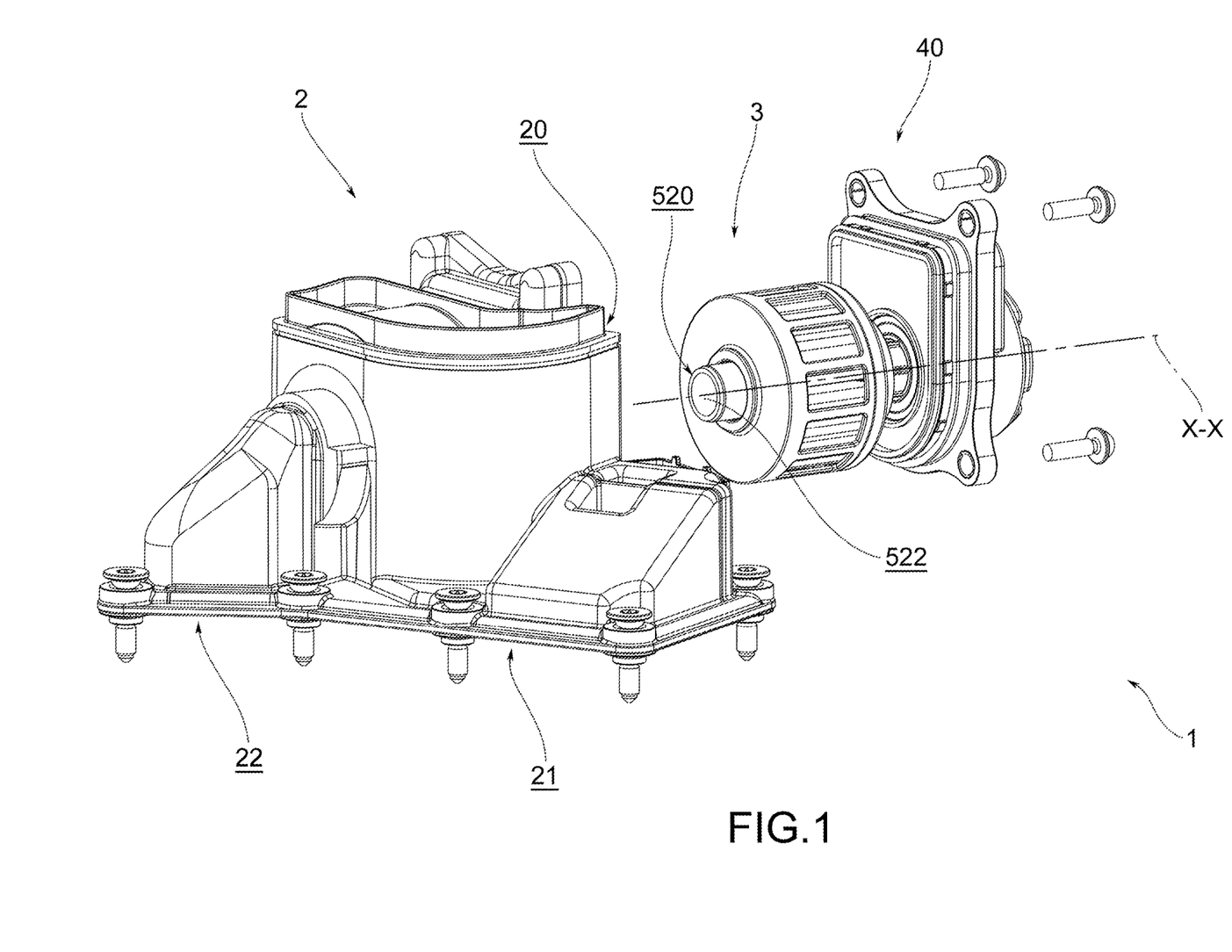
FIG. 1 shows a perspective view in separate parts of the blow-by gas filtration assembly of the present invention, according to a preferred embodiment.
Figure 2A:
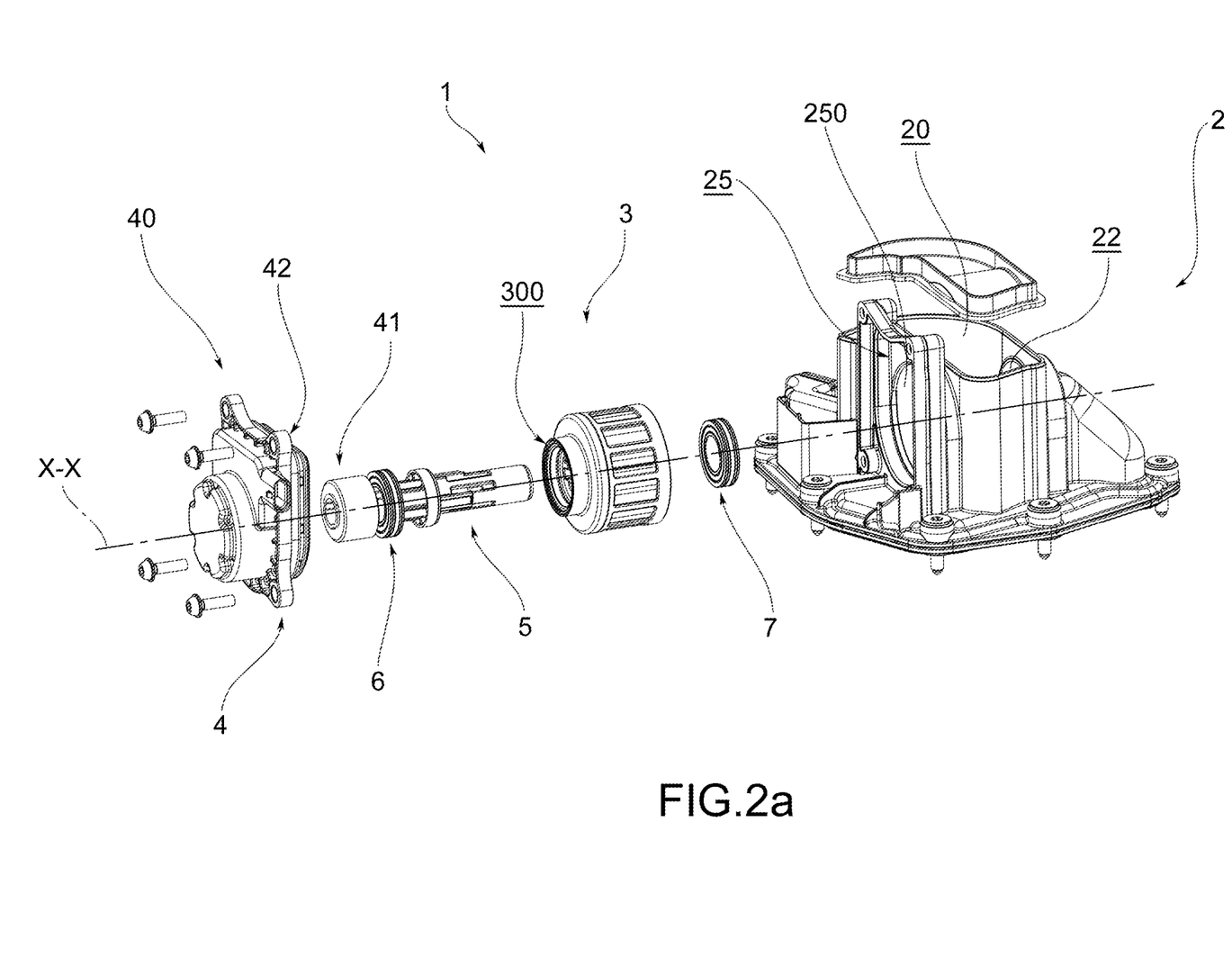
FIGS. 2a and 2b respectively show two perspective views in separate parts of the blow-by gas filtration assembly of the present invention.
Figure 2B:
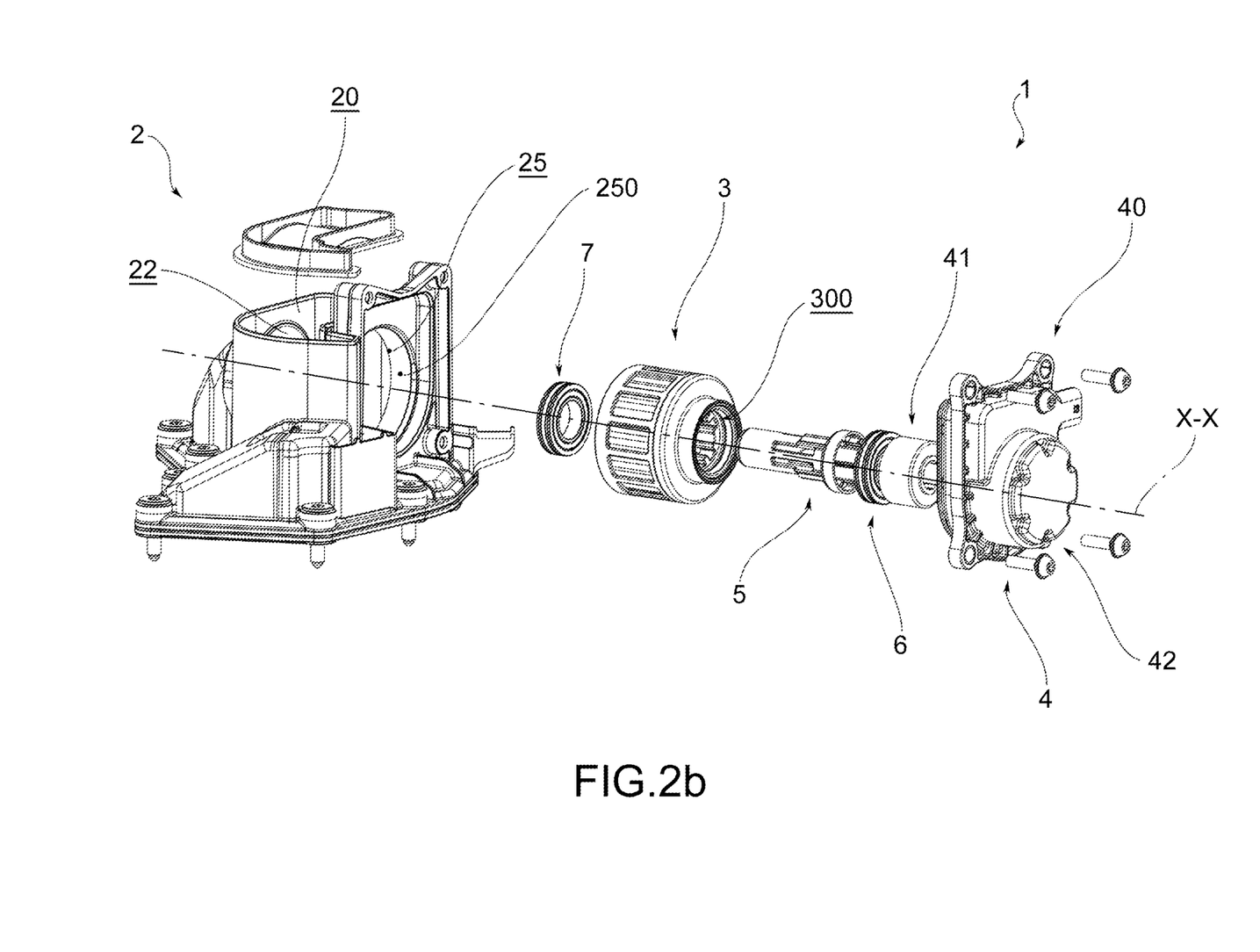
Figure 3:
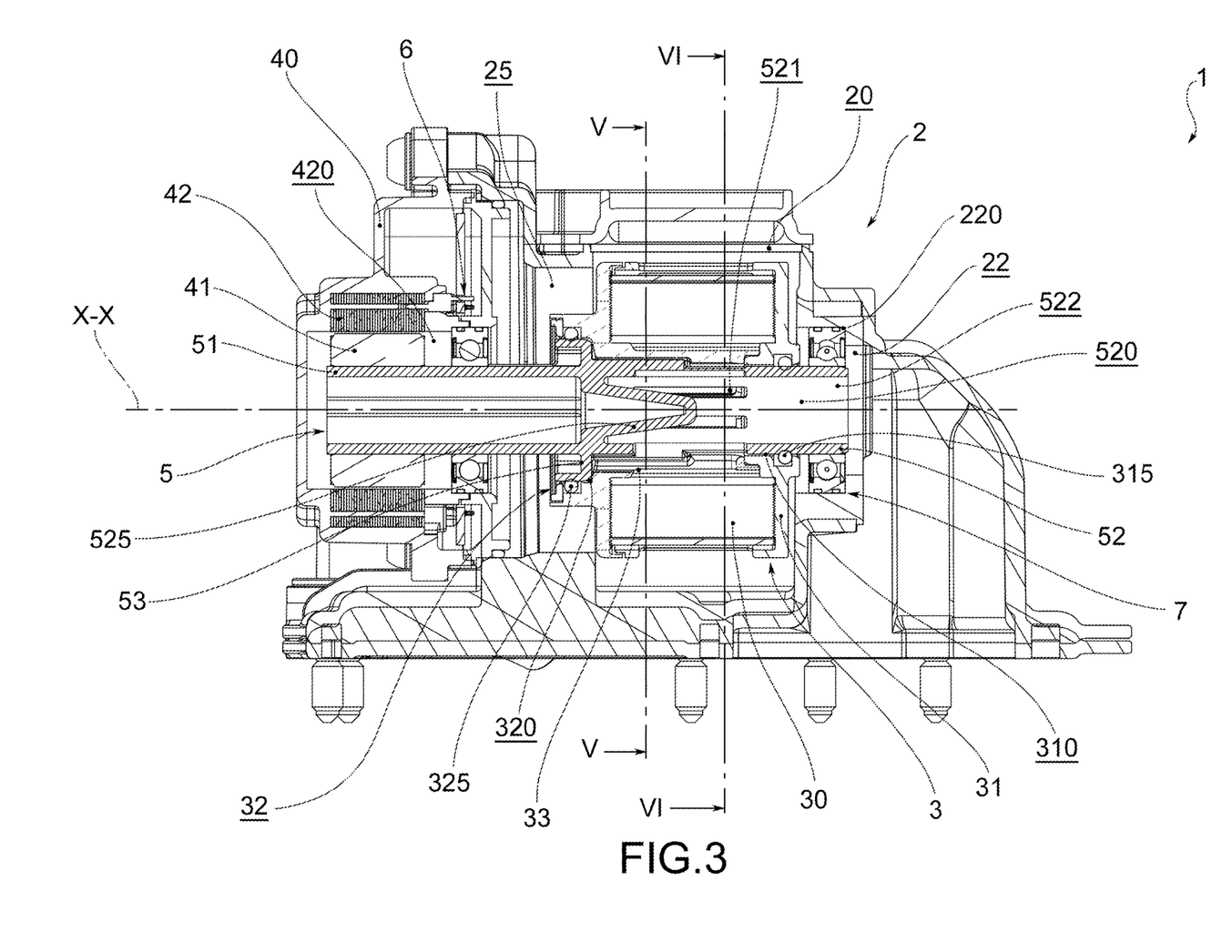
FIG. 3 shows a longitudinal cross-section view of the blow-by gas filtration assembly assembled and shown in the preceding figures.
Figures 4, 4A, 4B:
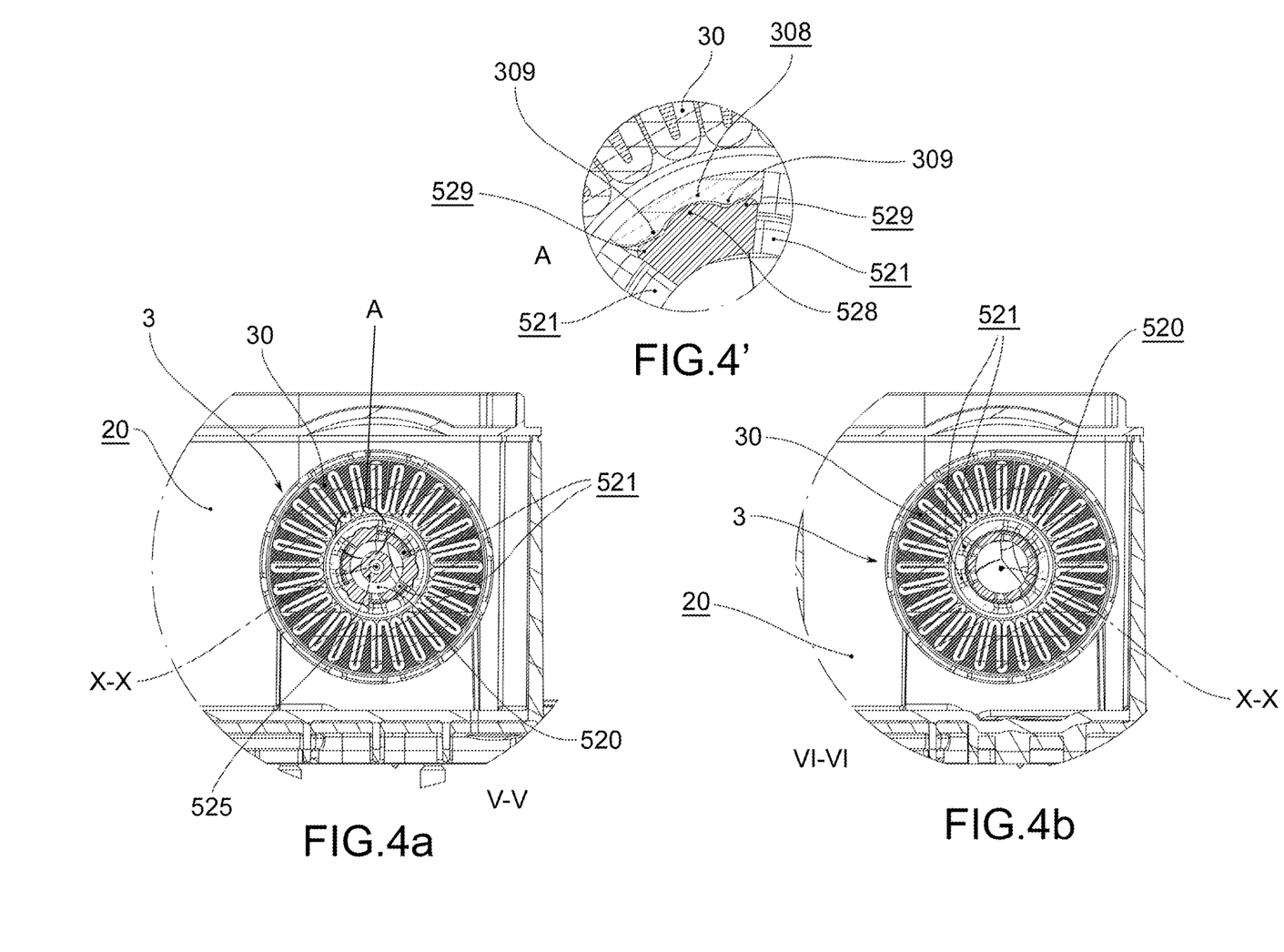
Figures 5A, 5B:
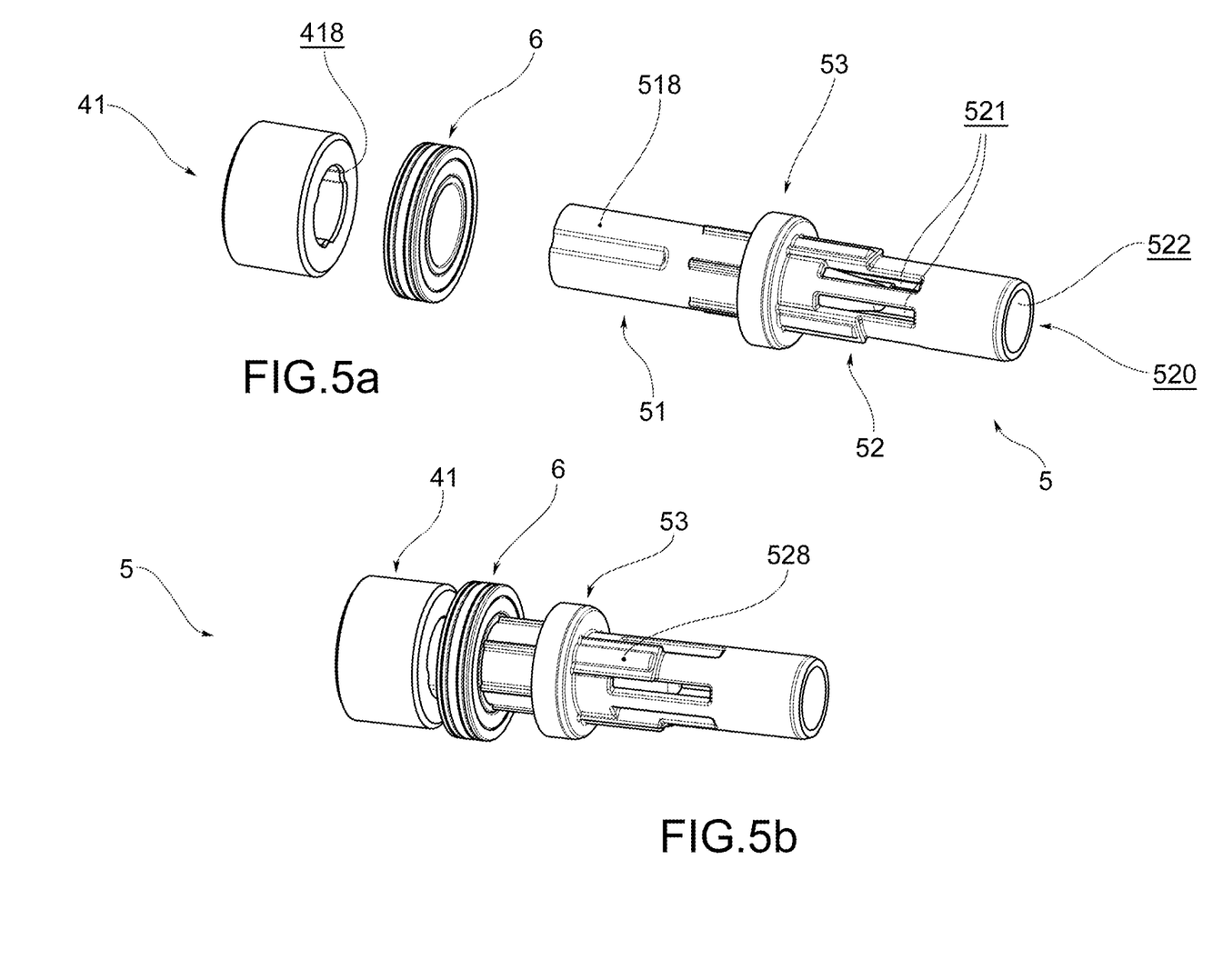
FIGS. 5a, 5b, 5c, 5d, 5e, and 5f show the various assembly steps of the blow-by gas filtration assembly according to the present invention.
Figure 5C:
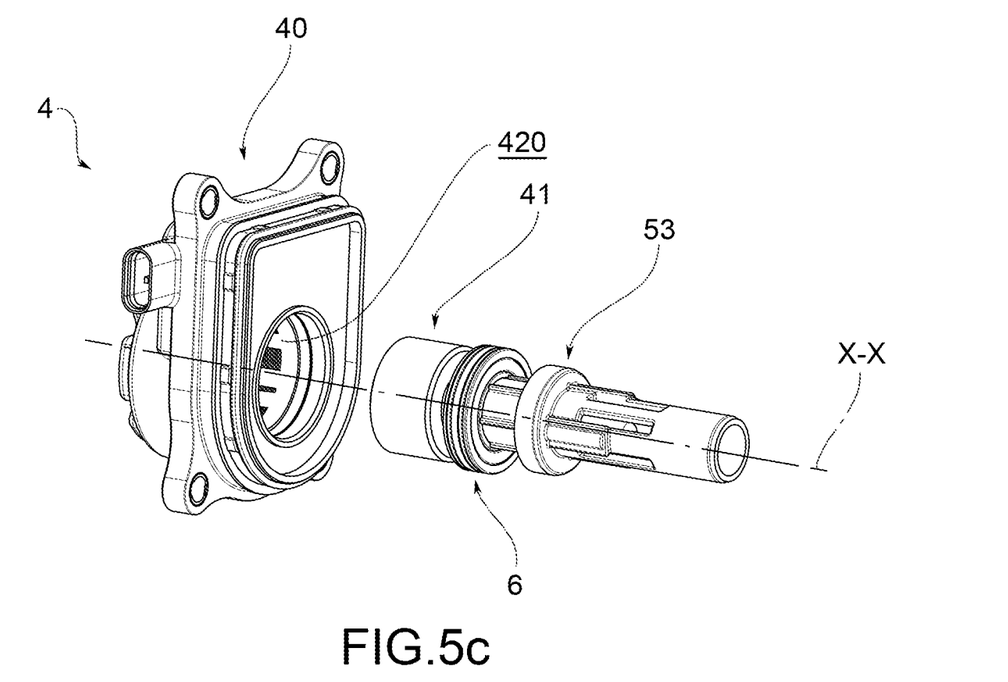
Figure 5D:
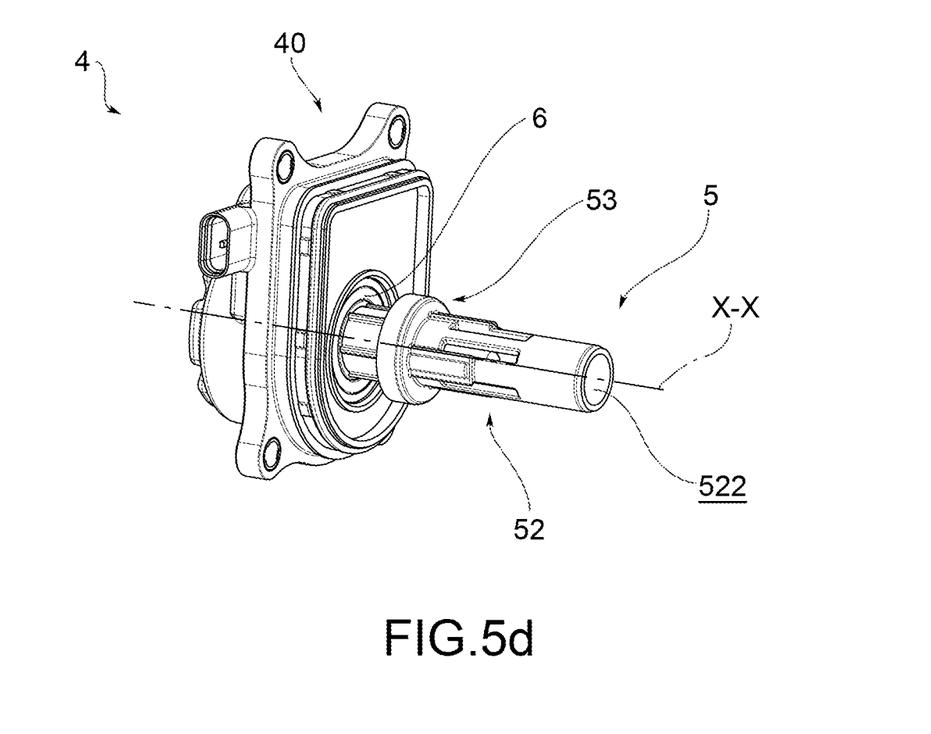
Figure 5E:
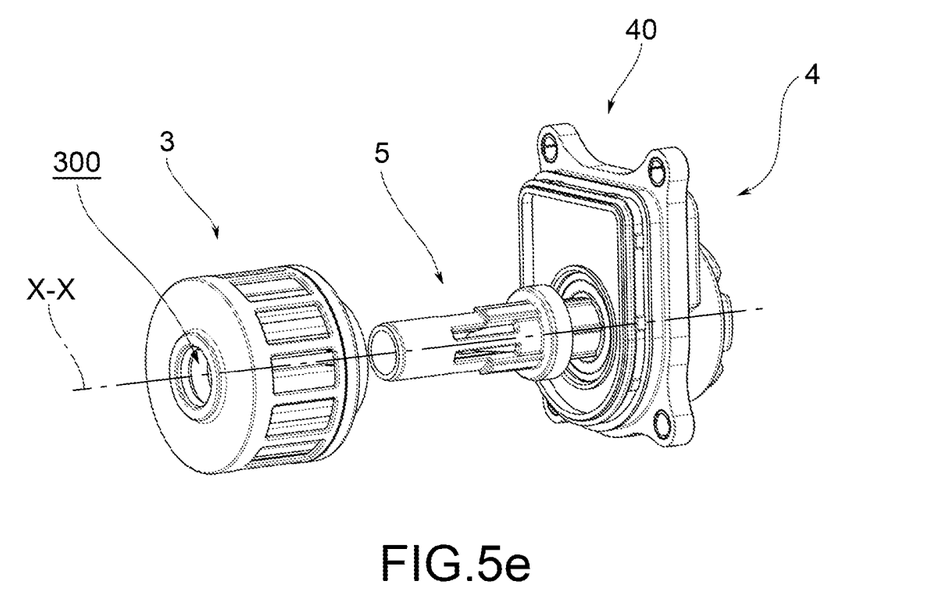
Figure 5F:
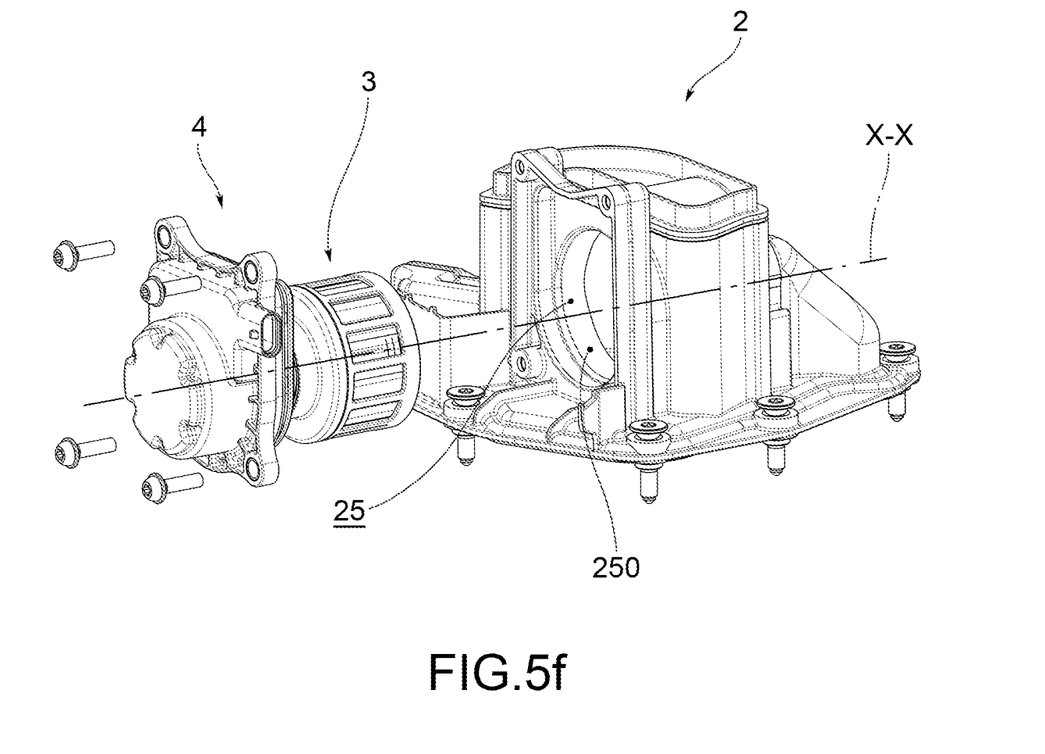

As shown in FIGS. 5a to 5f, provided by way of example, the assembly operations are extremely simplified, providing for the axial insertion of the various components onto the shaft and then the axial insertion of the group of components thus assembled in the main body.

Innovatively, the blow-by gas filtration assembly of the present invention widely fulfils the purpose of the present invention by presenting itself in a simple form and above all requiring simple assembly and disassembly operations.

Advantageously, the shaft is suitable for supporting and rotating the filter group. Advantageously, the shaft is also suitable to direct and facilitate the outflow of the filtered blow-by gases towards the outlet mouth.

Advantageously, the use of a shaft comprising a specific filter group support portion and a specific rotor support portion reduces the costs associated with the production of the filtration assembly by eliminating any alignment and/or compensation elements provided between the engine group and the filter group.

Advantageously, the shaft comprising the portions supporting the rotor and filter group allows a more compact filtration assembly to be built, providing, with equal dimensions, spaces which can be used to increase the filtering surface of the filter group, improving the filtering performance of the assembly. Advantageously, in particular, the blow-by gas filtration assembly is extremely compact both in the axial (longitudinal) dimension and, above all, in the radial dimension.

Advantageously, in a configuration with a filter group operating radially from the outside towards the inside, any gas recirculation inside the filtration chamber is minimized and the circulation of the filtered gases towards the outlet mouth and the intake of the gases to be filtered from the engine crankcase to the filtration chamber itself is favoured.

Advantageously, the shaft is a multifunctional component. Advantageously, the outlet duct of the filtered blow-by gases, the portions for supporting the filter group and the fluid coupling of said group to the outlet duct, the portions for supporting the rotor and the first bearing for supporting the shaft to the engine body and/or the main body are respectively provided in the shaft. Advantageously, the shaft is a hollow body, i.e. it is made at least partially in a hollow shape, reducing the weight of the filtration assembly, the consumption associated with the operation of the filtration assembly and the mechanical stresses on the parts (engine, bearings) responsible for keeping the filter group in rotation.

Advantageously, the shaft can be made in a single body eliminating any joints or interconnections between parts offering a simple solution, with greater structural strength able to ensure compliance with stricter dimensional and geometric tolerances.

Advantageously, the shaft (and thus the filter group) is easy to position in an axially aligned position, in particular aligned with the electric motor in particular with the rotation axis of the rotor.

Advantageously, the shaft ensures the alignment between the rotation axis of the rotor and the rotation axis of the filter group, reducing unwanted power consumption and minimizing the electricity consumption required by the vehicle for the operation of the filtration assembly.

Advantageously, the respective components, i.e. the rotor and the filter group, can be simply fitted onto the respective portions on the shaft.

Advantageously, the shaft is coupled to the outlet mouth by means of a bearing, reducing the friction generated by the rotation of the shaft and the components installed thereon, offering a better use of the available electricity or even a reduction in the electricity required of the electric motor.

Advantageously, the shaft is coupled on one side to the electric motor and on the other to the main body by means of respective bearings mounted at the opposite ends of the filter group, ensuring optimal alignment between the rotation axis of the rotor and the outlet mouth with respect to the adoption of sliding gaskets and at the same time reducing the friction caused by rotation.

Advantageously, the use of bearings ensures that coupling and sealing systems with a greater chemical resistance to the negative effects of blow-by gases are used instead of the adoption of gaskets which are more sensitive to wear and ageing phenomena.

Advantageously, the filter group is simple to fit/remove from the shaft, thus facilitating the assembly and maintenance of the filtration assembly.

Advantageously, the blow-by gas filtration assembly is extremely effective in the action on said blow-by gases thanks to the combined action of the filter group that filters the solid particles and above all agglomerates the suspended oil particles that are subsequently subjected to the centrifugal rotation action.

Advantageously, the use of a filter group with a porous filter medium rotated by the electric engine by means of said shaft allows effective filtration of blow-by gases at lower rotational speeds (3000 rpm) compared to separators equipped with discs/centrifuges operating at much higher speeds (10000 rpm), thus reducing the electricity consumption and also the acoustic emissions produced by the filtration assembly.

Advantageously, with a single operation in the axial direction, the various components are inserted into the main body and the blow-by gas filtration assembly is quickly ready for use.

Advantageously, with a minimum number of seals, the potential problem of blow-by gas leakage is remedied.

Advantageously, the shaft supports the bearing separating the rotor chamber from the filtration chamber to prevent and/or minimize the circulation of blow-by gases in the rotor chamber. Advantageously, in this way the accumulation of contaminants inside the rotor chamber is minimized ensuring optimal propagation of the magnetic field between stator and rotor and maintenance of the gap between stator and rotor useful for ensuring the free movement of the rotor with the lowest level of friction and dissipation.

Advantageously, the rotor remains contained inside the rotor chamber so that the engine portion of the shaft is not affected by the gas circulation, ensuring effective protection of the components of the electric motor from wear and degradation due to the accumulation of contaminants included in the blow-by gases. Advantageously, the shaft and rotor do not require periodic maintenance/replacement, but can be used for the entire service life envisaged for the filtration assembly, even if the filter group requires periodic replacement.

Advantageously, the filter group requires a minimum number of sealing elements, for example, a single gasket, possibly two gaskets, is sufficient.

Advantageously, the engine body of the electric motor can be fixed and sealingly coupled to the walls of the main body. Advantageously, the electric motor can be made as a stand-alone module that can be coupled after the filter group before installation on the main body.

It is clear that a person skilled in the art may make modifications to the blow-by gas filtration assembly so as to satisfy contingent requirements, all contained within the scope of protection as defined by the following claims.

LIST OF REFERENCE NUMBERS 1 blow-by gas filtration assembly
2 main body
20 filtration chamber
21 inlet mouth
22 outlet mouth
220 outlet edge
25 insertion opening
250 insertion edge
3 filter group
30 filter medium
31, 32 filter plate
310, 320 through openings
315 first gasket
325 second gasket
33 central structure
308 first notch
309 retaining protrusion elements
300 central chamber
4 engine group
40 engine body
41 rotor
418 second notch
42 stator
420 rotor chamber
5 shaft
51 engine portion
518 second protrusion
52 filter portion
520 outlet duct
528 first protrusion
529 safety housings
521 longitudinal slots
522 duct outlet
525 inner diffuser
6 first bearing
7 second bearing
X-X rotation axis

The invention claimed is:
1. A blow-by gas filtration assembly fluidically connectable to a ventilation circuit of base of an internal combustion engine to receive blow-by gases and filter the blow-by gases from suspended particles contained therein, wherein the filtration assembly has an axis and comprises:
- a main body comprising a filtration chamber extending along said axis and an outlet mouth formed at the axis;
- a filter group, extending along the axis having a hollow cylindrical shape comprising a central chamber, wherein the filter group is housed in said filtration chamber and is traversable radially by the blow-by gases;
- a motor group operatively connected to the filter group to control the filter group in rotation around the axis, wherein the motor group comprises a rotor and a stator;
- a support and control shaft, configured as a hollow body extending along the axis comprising a motor portion on which the rotor is housed and a filter portion on which the filter group is housed, wherein the rotor and the filter group are mounted integrally with the shaft respectively to the motor portion and to the filter portion so that a rotation of the shaft and therefore of the filter group corresponds to a controlled rotation of the rotor; wherein the filter portion comprises an outlet duct of the filtered blow-by gases in which outflow of said filtered blow-by gases towards the outlet mouth takes place.

2. Blow-by gas filtration assembly according to claim 1, wherein the shaft comprises a duct outlet, which fluidically connects an interior of the outlet duct and the outlet mouth, positioned at an axial end of the shaft.

3. Blow-by gas filtration assembly according to claim 2, wherein the shaft comprises an internal diffuser, housed in the outlet duct in an axially distal position from the duct outlet, which directs flow of filtered blow-by gases towards the duct outlet, wherein said internal diffuser has a substantially tapered shape in a direction of the duct outlet.

4. Blow-by gas filtration assembly according to claim 3, wherein said internal diffuser has a substantially conical shape in the direction of the duct outlet.

5. Blow-by gas filtration assembly according to claim 1, wherein the filter portion comprises a plurality of longitudinal slits through which the filtered blow-by gases flow into the outlet duct.

6. Blow-by gas filtration assembly according to claim 1, wherein the filter group and the filter portion are mutually engaged with shape coupling comprising along the axis at least one first notch and a first projection, respectively, which is housed in said first notch.

7. Blow-by gas filtration assembly according to claim 1, wherein the rotor and the motor portion are mutually engaged with shape coupling comprising along the axis respectively at least a second notch and a second projection which is housed in said second notch.

8. Blow-by gas filtration assembly according to claim 1, wherein the shaft comprises an abutment ring axially positioned between the motor portion and the filter portion, wherein said abutment ring extends in a radial direction and provides an axial abutment and a support for the filter group.

9. Blow-by gas filtration assembly according to claim 1, comprising a first support bearing fitted on the shaft, in the motor portion.

10. Blow-by gas filtration assembly according to claim 1, comprising a second support bearing engaging the shaft, in the filter portion, in a distal axial position from the motor group, wherein said second support bearing seals the filtration chamber.

11. Blow-by gas filtration assembly according to claim 1, wherein the motor portion is hollow.

12. Blow-by gas filtration assembly according to claim 1, wherein the shaft comprises a single molded thermoplastic material.

13. Blow-by gas filtration assembly according to claim 1, wherein the filter group comprises a filtering medium and two filter plates at the ends of the filtering medium, wherein said filter plates sealingly engage the shaft by a first annular gasket and a second annular gasket.

14. Blow-by gas filtration assembly according to claim 1, wherein the motor group comprises a motor body which houses the stator in which a rotor chamber is defined in which the rotor is housed, wherein said motor body is sealingly mountable to the main body.

15. Blow-by gas filtration assembly according to claim 14, comprising a first support bearing fitted on the shaft in the motor portion, wherein the first support bearing is housed in said motor body.

16. Blow-by gas filtration assembly according to claim 1, wherein the main body comprises an inlet mouth fluidically connectable to a ventilation circuit of the base of an internal combustion engine to receive the blow-by gases to be filtered and fluidically connected to the filtration chamber.

17. Blow-by gas filtration assembly according to claim 1, wherein the filter group is traversable radially from outside to inside by the blow-by gases.

18. Blow-by gas filtration assembly according to claim 1, wherein the filter portion comprises a plurality of longitudinal slits, reciprocally angularly equidistant, through which the filtered blow-by gases flow into the outlet duct.

* * * * *